United States Patent
Konnail et al.

(10) Patent No.: US 8,010,818 B2
(45) Date of Patent: Aug. 30, 2011

(54) POWER EFFICIENT METHOD FOR CONTROLLING AN OSCILLATOR IN A LOW POWER SYNCHRONOUS SYSTEM WITH AN ASYNCHRONOUS I2C BUS

(75) Inventors: George Vincent Konnail, Dallas, TX (US); Robert Wayne Mounger, Dallas, TX (US); Jose Vicente Santos, Dallas, TX (US); Sanjay Pratap Singh, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 628 days.

(21) Appl. No.: 12/126,049

(22) Filed: May 23, 2008

(65) Prior Publication Data

US 2009/0292840 A1  Nov. 26, 2009

(51) Int. Cl.
*G06F 1/32* (2006.01)
(52) U.S. Cl. ............... 713/323; 713/322; 710/61
(58) Field of Classification Search .......... 713/322–323; 710/61
See application file for complete search history.

(56) References Cited

U.S. PATENT DOCUMENTS

| 6,047,378 A * | 4/2000 | Garrett et al. ............... 713/300 |
| 6,301,673 B1 * | 10/2001 | Foster et al. ............... 713/323 |
| 7,243,250 B2 * | 7/2007 | Ueda ............... 713/323 |
| 7,694,025 B1 * | 4/2010 | Norrie ............... 710/3 |

\* cited by examiner

*Primary Examiner* — Thuan N Du
(74) *Attorney, Agent, or Firm* — John J. Patti; Wade J. Brady, III; Frederick J. Telecky, Jr.

(57) ABSTRACT

In a method and apparatus for saving power in a device coupled to a bus, the device is placed to operate in a power saving mode by powering off a selective portion of the device including a device clock. If data communication over the bus is addressed to the device then the selective portion of the device, including the device clock, is triggered to return to a power on state from the power off state. The data communication is stored in shadow registers using a bus clock while the device clock is transitioning to the power on state. The data communication stored in the shadow registers is transferred to a register map under the control of the device clock operating in the power on state. Upon completion of the transfer of the data communication to the register map, the device is returned to operate in the power saving mode.

25 Claims, 4 Drawing Sheets

POWER EFFICIENT METHOD FOR CONTROLLING AN OSCILLATOR IN A LOW POWER SYNCHRONOUS SYSTEM WITH AN ASYNCHRONOUS I2C BUS

BACKGROUND

The present disclosure relates generally to power management in electronic circuits, and more particularly to a method and an apparatus for reducing power consumption in an electronic system communicating over a serial bus.

The Inter Integrated Circuit (I2C) bus is a well known bi-directional, two-wire serial data bus that may be used to enable one or more devices, including integrated circuit (IC) chips, to communicate with one another and form an electronic system. Each device coupled to the I2C bus is recognized by a unique address and may operate either as a receiver or transmitter of information. Additionally, these devices are configurable to operate in either a master or slave mode, depending on whether the device initiates communication with other devices or simply receives communication from other devices.

The I2C bus includes a serial data line for communicating data and a serial clock line for communicating a clock signal. Transfer of data between one or more master devices and the one or more slave devices occurs in an asynchronous manner and in accordance with the I2C bus communications protocol. A slave device coupled to the I2C bus may be configured to operate in a synchronous domain.

It would be desirable to turn off one or more components included in the slave device to conserve power, the slave device being operable in the synchronous domain. However, by placing the slave device or components thereof in a power off mode there is an increased probability that some I2C transactions (such as performing a write to the slave device) may be missed by the slave device. If the slave device is always operated in a power on state to capture the I2C transactions then the power consumption is increased. Therefore, a need exists to provide an improved method and apparatus to reduce power in the slave device while being responsive to capturing I2C transactions.

SUMMARY

Applicants recognize that certain power consuming components such as an oscillator (also referred to as a device clock or a slave device clock) and a band gap voltage reference included in the slave device, operating in a synchronous domain, may be turned off in idle mode to conserve power. Upon receiving a command to wake up or return to a power on state, the oscillator and the band gap voltage reference may experience a variable time delay in transitioning to the power on state. That is, the turn on time for the oscillator and the band gap voltage reference components may be greater than the I2C transaction time. As such, co-ordination and integrity of data transfer between I2C devices operating in an asynchronous domain and the slave device operating in the synchronous domain may be a challenge.

Applicants also recognize that in order to reduce the possibility of a loss of data communication addressed to the slave device, especially while the slave device is transitioning from the power save mode to the normal power mode, it would be desirable to: 1) capture the data communication received from the asynchronous domain without the assistance of the oscillator and the band gap voltage reference, 2) ensure that the oscillator and the band gap voltage reference are operating in the power on state, and 3) transfer the data communication addressed to the slave device without incurring any loss of data. Therefore, it would be desirable to provide an improved method and apparatus to reduce power in the slave device while being responsive to capturing I2C transactions. Accordingly, it would be desirable to provide a method and apparatus for reducing power consumed by a device coupled to a communications bus while being responsive to data communication addressed to the device, absent the disadvantages found in the prior methods discussed above.

The foregoing needs are addressed by the teachings of the present disclosure, which relates to an apparatus and method for saving power in a device coupled to a bus. According to one embodiment, in an apparatus and method for saving power in a device coupled to a bus, the device is placed to operate in a power saving mode by powering off a selective portion of the device including a device clock. If data communication over the bus is addressed to the device then the selective portion of the device, including the device clock, is triggered to return to a power on state from the power off state. The data communication is stored in shadow registers using a bus clock while the device clock is transitioning to the power on state. The data communication stored in the shadow registers is transferred to a register map under the control of the device clock operating in the power on state. Upon completion of the transfer of the data communication to the register map, the device is returned to operate in the power saving mode.

In one aspect of the disclosure, an apparatus for transferring data communication between an asynchronous domain and a synchronous domain includes a shadow data register coupled to a bus. The shadow data register is operable to receive a data portion of data communication over the bus. A shadow address register is coupled to the bus, the shadow address register being operable to receive an address portion of the data communication. A register map is coupled to the shadow data register and to the shadow address register, the register map being operable to store the data portion at a register map address corresponding to the address portion. A comparator compares the address portion and a maximum address plus 1 and generates an output responsive to the address portion being less than the maximum address plus 1. A first flip flop and a second flip flop coupled in series with the comparator. The first flip flop is operable to receive the output and provide a second output. The second flip flop is operable to receive the second output and provide a clear pulse output, the clear pulse output being provided to reset the shadow data register and the shadow address register respectively to a '0' value and the maximum address plus 1 value.

Several advantages are achieved by the method and apparatus according to the illustrative embodiments presented herein. The embodiments provide an improved method and apparatus for reducing power consumed by a slave device coupled to a bus while being responsive to capturing relevant I2C transactions. The embodiments described herein provide tools and techniques to enable slave devices to continuously operate in a power saving mode until data communication over an I2C bus is specifically addressed to the slave device. The embodiments described herein use a minimum number of extra registers (in addition to the register map), thereby resulting in reduced silicon area and reduced power compared to other circuit implementations that may shadow the entire register map. Components of the slave device supporting a synchronous mode such as an oscillator and band gap voltage reference are transitioned to a power on state only if the data communication is addressed to the slave device. Since the oscillator and the band gap voltage reference may experience a variable time delay in transitioning to the power on state, the turn on time for the oscillator and the band gap voltage reference components may be greater than the I2C transaction time. During the transition period, the tools and techniques provide capturing and storing of the data communication, ensuring that the oscillator and the band gap voltage reference are operating in the power on state, synchronously transfer the data communication to the slave device, and returning the slave device to the power saving mode upon completion of the synchronous transfer.

DETAILED DESCRIPTION

Figure 1:
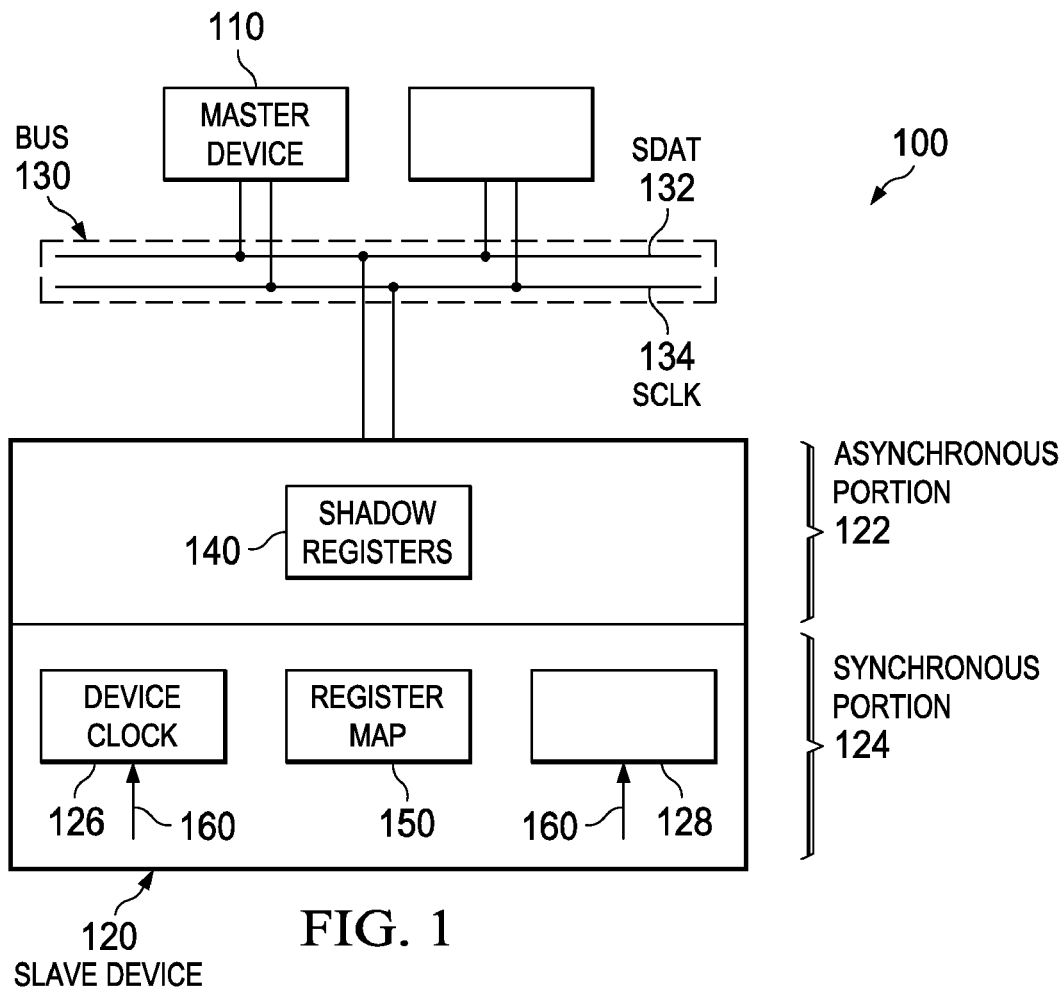
FIG. 1 illustrates a block diagram of an electronic system 100, according to an embodiment.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip 'SoC'), firmware (including application specific integrated circuits and programmable chips) and/or software or a combination thereof, depending on the application requirements.

Similarly, the functionality of various mechanical elements, members, or components for forming modules, sub-assemblies and assemblies assembled in accordance with a structure for an apparatus may be implemented using various materials and coupling techniques, depending on the application requirements. Descriptive and directional terms used in the written description such as top, bottom, left, right, and similar others, refer to the drawings themselves as laid out on the paper and not to physical limitations of the disclosure unless specifically noted. The accompanying drawings may not to be drawn to scale and some features of embodiments shown and described herein may be simplified or exaggerated for illustrating the principles, features, and advantages of the disclosure.

In a system comprised of multiple master or slave devices connected by an I2C bus, it would be desirable to turn off one or more power consuming components included in the slave device to conserve power, the slave device operating in the synchronous domain. However, by placing the slave device or components thereof in a power off mode there is an increased probability that I2C transactions (such as performing a write to the slave device) may be missed by the slave device. Therefore, a need exists to provide an improved method and apparatus to reduce power in the slave device while being responsive to capturing I2C transactions. This problem may be addressed by an improved apparatus and method for capturing I2C data communication specifically directed to the slave device while enabling the slave device to reduce power when the data communication is not directed to the slave device.

According to one embodiment, in a method and apparatus for saving power in a device coupled to a bus, the device is placed to operate in a power saving mode by powering off a selective portion of the device including a device clock. If data communication over the bus is addressed to the device then the selective portion of the device, including the device clock, is triggered to return to a power on state from the powered off state. The data communication is stored in shadow registers using a bus clock while the device clock is transitioning to the power on state. The data communication stored in the shadow registers is transferred to a register map under the control of the device clock operating in the power on state. Upon completion of the transfer of the data communication to the register map, the device is returned to operate in the power saving mode.

The following terminology may be useful in understanding the present disclosure. It is to be understood that the terminology described herein is for the purpose of description and should not be regarded as limiting.

Electronic Device—A device that utilizes electronic properties of semiconductor materials to perform a desired function. A device may be manufactured as a single discrete device or as one or more integrated circuits (ICs) packaged into a module.

System—One or more interdependent elements, components, modules, or devices that co-operate to perform one or more predefined functions.

Configuration—Describes a set up of an element, a circuit, a package, an electronic device, and similar other, and refers to a process for setting, defining, or selecting particular properties, parameters, or attributes of the device prior to its use or operation. Some configuration attributes may be selected to have a default value. For example, a width of a clear pulse may be configured to be equal to two clock periods.

Data Communication—Electronic transfer of data between two electronic devices. The transfer of data usually occurs over a suitable transmission medium such as a bus or a network. The data communication may occur in accordance with a bus protocol. Content of the data communication may include a data content portion and an address portion.

Power saving modes of operation—An electronic device is operable in a plurality of operating modes (or states) such as active, normal, power saving, power on, power off, test, off-line, and similar others. While operating in the active or normal or power on or full power operating mode, the device performs desired function(s) and consumes rated power. Any operating mode that provides a reduction in power compared to the active mode is described as a power saving mode or power reduction mode of operation. The device may typically include a power management controller (PMC) to control entry and exits into the various operating modes in response to receiving monitoring inputs such as processor activity.

A system comprising a plurality of devices coupled to a bus with at least one of the plurality of devices capable of operating in a power saving mode while being responsive to data communication over the bus is described with reference to FIGS. 1, 2 and 3. A timing diagram for a slave device is described with reference to FIG. 4. A method for saving power is described with reference to FIG. 5.

FIG. 1 illustrates a block diagram of an electronic system 100, according to an embodiment. The electronic system 100 includes a plurality of devices including a master device (MD) 110 and a slave device (SD) 120 communicating over a bus 130. As described herein, any one of the plurality of devices may be configured to operate as the MD 110, which is capable of initiating as well as receiving data communication over the bus 130. Similarly, any one of the plurality of devices may be configured as the SD 120, which is capable of receiving but not initiating data communication over the bus 130. In some applications, the same device may be configured to operate as a master device for one transaction and as a slave device for another transaction.

In a particular embodiment, the bus 130 is implemented as the Inter Integrated Circuit (I2C) bus. As described earlier, the I2C bus is a well known bi-directional, two-wire serial data bus. The two-wires include a line for data SDAT 132 signal and a line for a clock SCLK 134 signal. In a particular embodiment, the data communication includes a data portion and a data address portion. In an embodiment, data communication for a write operation may include a slave device address, a write data address, and a write data. The SCLK 134 signal may be provided by any one of the plurality of devices operating as a transmitter of information. It is understood that any one of the plurality of devices may include a local clock for synchronized operation of the device.

An I2C bus transaction, e.g., read or write operation, includes transfer of data communication between the plurality of devices in accordance with the I2C bus protocol. An exemplary I2C bus transaction sequence may include: 1) the MD 110 sending a start command to all devices connected to the I2C bus, 2) MD 110 sending the device address information it would like to communicate with, 3) SD 120 matching the device address information with its own address and sending an acknowledge SDA_EN signal (not shown), 4) MD 110 receiving the SDA_EN signal and sending data information to the SD 120, and 5) when transfer of data information is complete MD 110 issuing a stop command, thereby indicating a completion of the I2C bus traction and releasing the bus 130. It is understood that the exact sequence of the I2C bus transaction may include less or more number of steps. For example, after step 3, a register address (as opposed to slave device address) may be sent by the master device, then an acknowledgement of receiving the register address is sent by slave device, then register data is sent by master device and then an acknowledgement is sent by the slave device and then stop command is sent by the master device.

In a particular embodiment, the SD 120 is a driver circuit capable of driving an electroluminescent lamp (EL) or panel in a portable, battery powered electronic device. It is desirable to extend operating life of portable battery powered electronic devices by providing power management. To conserve power, it is desirable to continuously operate the SD 120 in a power saving mode except when an I2C transaction is directed to SD 120. That is, in a particular application the SD 120 or portions thereof is triggered or awakened by a BG_OSC_ENABLE 160 signal to operate in a power on mode only when the I2C transaction is addressed to the SD 120. It is also desirable that the SD 120 be operable to capture and store all I2C transactions that are addressed to it independent of its power on or power off operating status.

In the depicted embodiment, the SD 120 includes an asynchronous portion 122 and a synchronous portion 124. In the asynchronous portion 122, the SCLK 134 signal controls data communication from the bus 130 to the SD 120. In the synchronous portion 124, a device clock 126 (also referred to as an oscillator or slave clock) signal controls data communication between the asynchronous portion 122 and the synchronous portion 124. Also included in the synchronous portion 124 is a band gap voltage reference 128 that is used as a voltage reference circuit in the SD 120. For example, the band gap voltage reference 128 may be used to maintain an accuracy of the device clock 126.

The SD 120 is operable in a power saving mode by powering off a selective portion of the device. The selective portion may be configured to include one or more components of the SD 120. In a particular embodiment, the selective portion is configured to include the device clock 126 and the band gap voltage reference 128. A finite but variable time delay is associated with the transitioning of the device clock 126 and the band gap voltage reference 128 between the power off state and the power on state. That is, the device clock 126 may take a variable amount of transition time from the instant it exits the power off state to the instant it is functional to generate clock pulses in the power on state. The variation in the transition time may be caused due to variations in the process, voltage and temperature (PVT) conditions. Additional detail of the timing aspects of the SD 120 receiving data communication over the bus 130 is described with reference to FIG. 4.

Since the delay in triggering the device clock 126 from a power off state to a power on state may exceed an I2C transaction time, data communication from the bus 130 that is addressed to SD 120 is captured and stored in shadow registers 140 included in the asynchronous portion 122 of the SD 120. The storing of the data communication in the shadow registers 140 is independent of the device clock 126 and the band gap voltage reference 128. The BG_OSC_ENABLE 160 is asserted upon determining that the data communication is addressed to SD 120, thereby triggering the device clock 126 and the band gap voltage reference 128 to transition to a power on state. When the device clock 126 is fully operational in the power on state, data communication stored in the shadow registers 140 is transferred to a register map 150 included in the synchronous portion 124 of the SD 120. Upon completion of the transfer of the data communication to the register map 150, the BG_OSC_ENABLE 160 is deasserted, thereby placing the SD 120 back in the power saving mode. Additional detail of generating the BG_OSC_ENABLE 160 signal is described with reference to FIG. 2 and additional detail of the SD 120 is described with reference to FIG. 3. In a particular embodiment, the shadow registers 140 and the register map 150 are capable of being implemented as memory devices.

Figure 2:
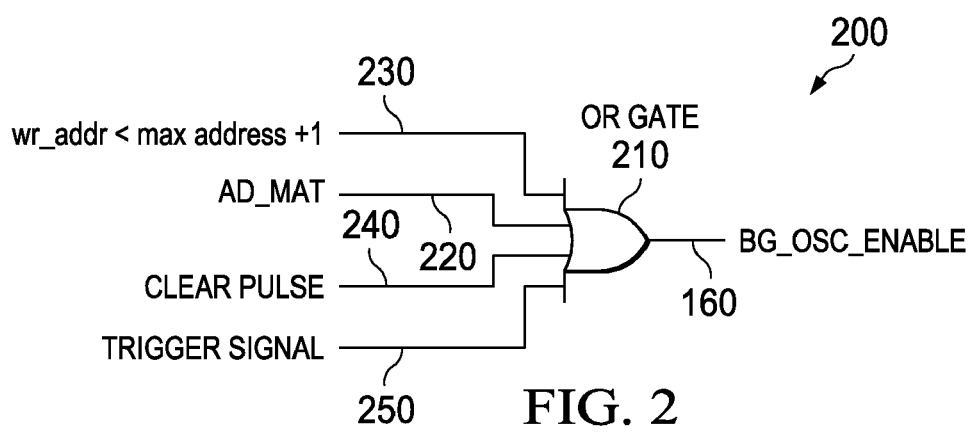
FIG. 2 illustrates a circuit diagram to generate a trigger signal for turning on a selective portion of a slave device described with reference to FIG. 1, according to an embodiment.

FIG. 2 illustrates a diagram for circuit 200 operable to generate a trigger signal for turning on a selective portion of a slave device described with reference to FIG. 1, according to an embodiment. In an embodiment, the SD 120 includes the circuit 200. The circuit 200 includes an OR gate 210 coupled to receive the following 4 inputs: 1) an address match AD_MAT 220 signal indicative of the data communication being addressed to the SD 120, 2) an address portion WR_ADDR 230 of the data communication received from the bus 130 being less than a maximum address plus 1 (MAX_ADDR_PLUS_1), where maximum address plus 1 is indicative that the WR_ADDR 230 is invalid, 3) a clear pulse signal 240, the clear pulse signal 240 being asserted on a second leading edge of the device clock 126 operating in the power on state, and 4) a trigger signal 250 is indicative of the device clock 126 being placed in the power on state by another circuit (not shown) of the SD 120. The OR gate 210 asserts the BG_OSC_ENABLE 160 signal when any one of the 4 inputs is asserted and deasserts the BG_OSC_ENABLE 160 signal when all 4 inputs are deasserted. Thus, the BG_OSC_ENABLE 160 signal triggers the device clock 126 and the band gap voltage reference 128 circuits as soon as SD 120 determines that a device address being communicated over the bus 130 matches its own address.

Figure 3:
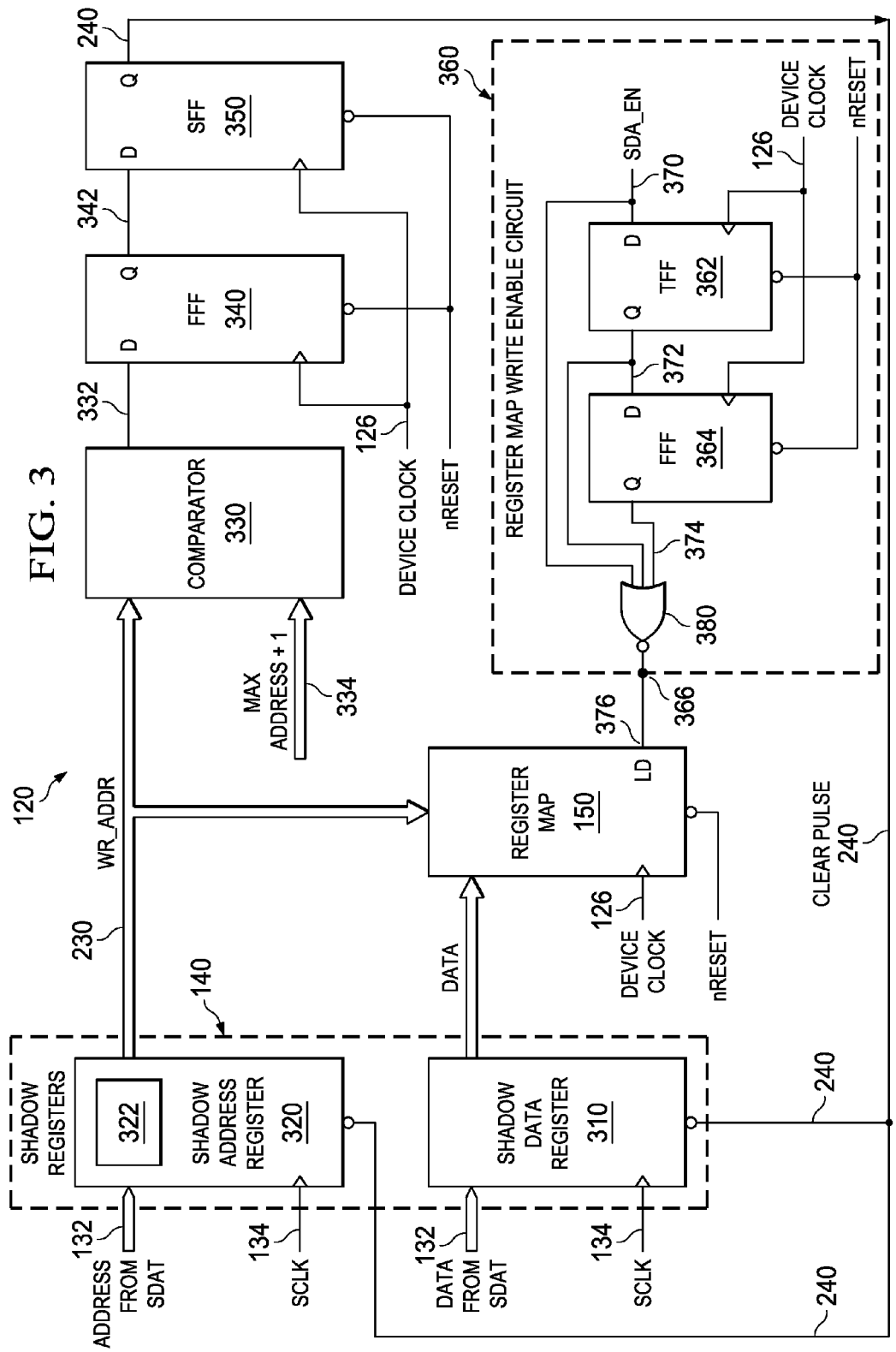
FIG. 3 illustrates additional details of a slave device described with reference to FIG. 1, according to an embodiment.

FIG. 3 illustrates additional details of a slave device described with reference to FIG. 1, according to an embodiment. The data communication received from the bus 130 and stored in the shadow registers 140 includes a data portion and a data address portion. The validity of the data address portion is verified before being loaded into the shadow registers 140. That is, if the data address portion is greater than a maximum address MAX_ADDR 322 than an error is generated and the shadow registers 140 discard the data communication.

In the depicted embodiment, the slave device 120 comprises the shadow registers 140, which include a shadow data register 310 and a shadow address register 320, and the register map 150. The shadow data register 310 is coupled to the bus 130 to receive the data portion of the data communication addressed to the SD 120 and the shadow address register 320 is coupled to the bus 130 to receive the data address portion of the data communication addressed to the SD 120. As described earlier, capture and storing of the data portion and the data address portion of the data communication is controlled by the SCLK 134 signal. Specifically, on the $27^{th}$ leading edge of the SCLK 134 signal the data portion and the data address portion of the data communication is captured and stored in the shadow data register 310 and the shadow address register 320 respectively.

In response to asserting the BG_OSC_ENABLE 160 signal, as described with reference to FIG. 2, and after a finite but variable transition time to become operational, the device clock 126 generates a first clock pulse in the power on state. At this time, the data portion is transferred to the register map 150 and stored at a register address corresponding to the data address portion.

The SD 120 includes a comparator 330 to compare the data address portion and a maximum address plus 1 (MAX_ADDR_PLUS_1 334) and generate a comparator output 332 that is responsive to the data address portion being less than the MAX_ADDR_PLUS_1 334. The comparator output 332 is asserted on the leading edge of the first clock pulse if the WR_ADDR 230 is less than MAX_ADDR_PLUS_1 334. A first flip flop 340 and a second flip flop 350 are coupled in series with the comparator 330. The first flip flop 340 is operable to latch the comparator output 332 and provide a first output 342. The second flip flop 350 is operable to latch the first output 342 on the second leading edge of the device clock 126 and provide the clear pulse signal 240. The clear pulse signal 240 is provided to reset the shadow data register 310 and the shadow address register 320 to a configurable value, e.g., 0 and MAX_ADDR_PLUS_1 respectively. The shadow data register 310 and the shadow address register 320 hold the 0 and MAX_ADDR_PLUS_1 values until the occurrence of the next I2C transaction that is addressed to SD 120. In a particular embodiment, the clear pulse signal 240 has a width equal to two clock periods of the device clock 126. Configuration of two flip flops, e.g., the first flip flop 340 and the second flip flop 350, provides synchronization and improves stability. Since the first flip flop 340 captures an asynchronous signal, there may be a possibility that that the flip flop may go into an unstable state. The second flip flop 350 ensures that this unstable state is not propagated to the rest of the circuitry.

In the depicted embodiment, the SD 120 includes a register map write enable circuit 360. The register map write enable circuit 360 includes a third flip flop 362 coupled to receive a SDA_EN 370 signal and provide an SDA_EN_META1 372 signal. A fourth flip flop 364 is coupled to receive the SDA_EN_META1 372 signal and provide a SDA_EN_META2 374 signal. A NOR gate 380 is coupled to receive the SDA_EN 370 signal, the SDA_EN_META1 372 signal, and the SDA_EN_META2 374 signal and provide a write enable signal 366. The write enable signal 366 is provided to the register map 150 as an LD input 376 and is used for controlling the store of the data portion in the register map 150. The write transaction to the register map 150 does not occur before the I2C transaction completes because no write operation is enabled when SDA_EN 370 is high. The register map write enable circuit 360 reduces any potential timing issues in the case where the device clock 126 is already on and operational before the I2C transaction is completed.

Figure 4:
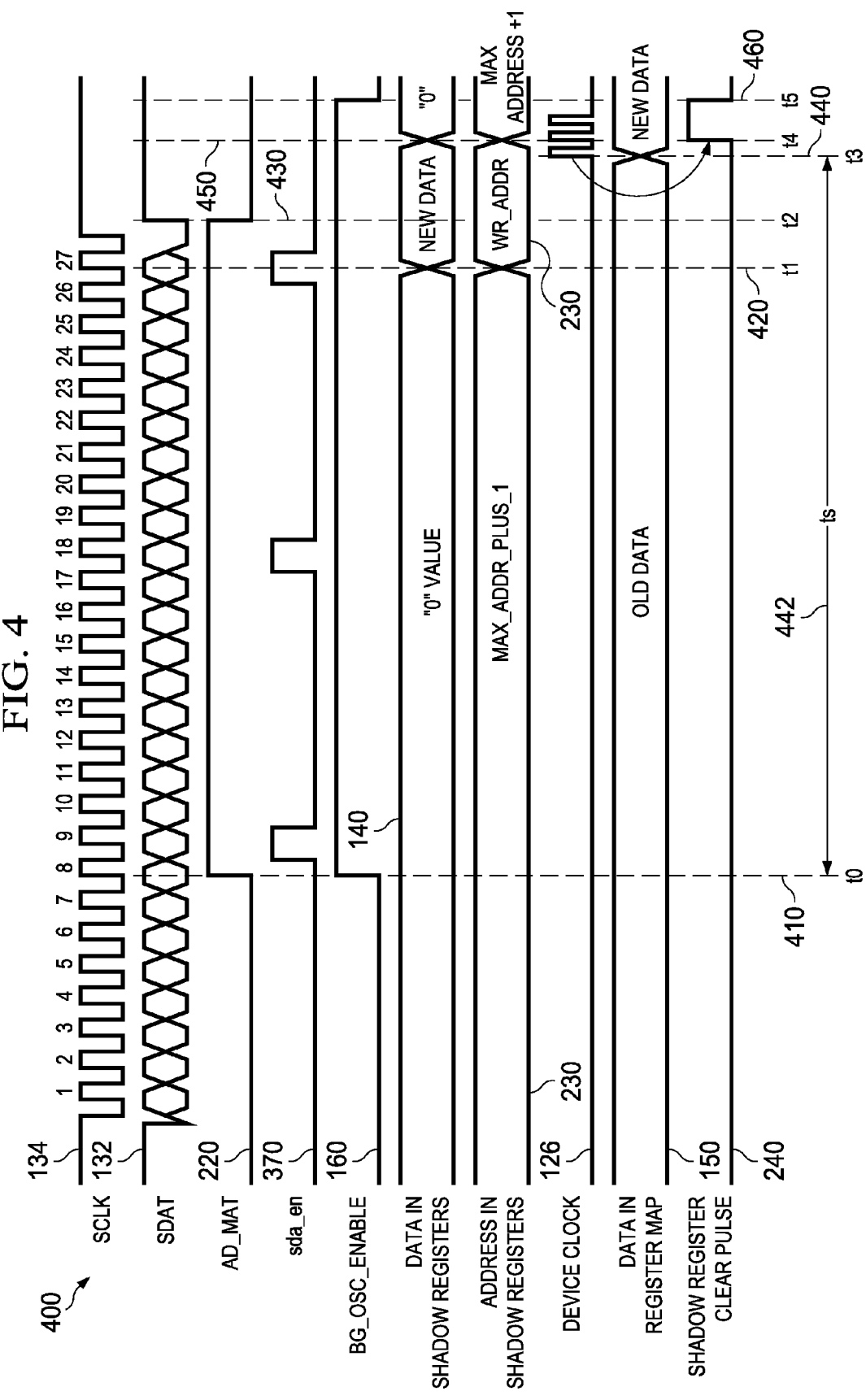
FIG. 4 illustrates exemplary waveforms 400 associated with a slave device described with reference to FIGS. 1, 2, and 3, according to one embodiment.

FIG. 4 illustrates exemplary waveforms 400 associated with a slave device described with reference to FIGS. 1, 2, and 3, according to one embodiment. At time t0 410, which coincides with the eighth rising edge of the SCLK 134 signal, SD 120 determines that the device address included in the data communication received over the bus 130 matches its own address. In response to determining that there is a match, AD_MAT 220 signal is asserted. As described earlier, SD 120 generates SDA_EN 370 signal as a sequence of three pulses occurring every ninth period of SCLK 134 to acknowledge the matching device address, the data address portion and the data portion respectively. As described with reference to FIG. 2, the BG_OSC_ENABLE 160 signal is asserted when AD_MAT 220 signal is asserted, thereby triggering the transition of selective portion of the SD 120, e.g., the device clock 126 and the band gap voltage reference 128, from a power off state to a power on state.

At time t1 420, which coincides with a third pulse of SDA_EN 370 signal, the data address portion and the data portion of the data communication received over the bus 130 is complete and saved into the shadow address register 320 and shadow data register 310 respectively. Prior to time t1 420, content of the shadow address register 320 and shadow data register 310 is MAX_ADDR_PLUS_1 and 0 respectively from a previous I2C transaction. At time t2 430, the AD_MAT 220 signal is deasserted indicating that the I2C transaction is complete. At time t2 430, the BG_OSC_ENABLE 160 continues to be asserted since the condition WR_ADDR 230 is less than MAX_ADDR_PLUS_1 is true. At time t3 440, a first leading edge of the device clock 126 is generated. Thus, time difference between t3 440 and t0 410 is the finite but variable time delay or transition time ts 442 associated with the startup of the selective portion of the SD 120. At time t3 440, the data address portion and the data portion of the data communication that is saved into the shadow address register 320 and shadow data register 310 respectively is transferred to the register map 150. Specifically, the data address portion is stored at a register map address location corresponding to the data address location.

At time t4 450, which coincides with a leading edge of the second time period of the device clock 126, the clear pulse signal 240 is asserted by the second flip flop 350 and provided to the shadow address register 320 and shadow data register 310 to reset them to MAX_ADDR_PLUS_1 334 and 0 respectively. At time t5 460, the clear pulse signal 240, which has a width equal to two periods of the clock device 126 is deasserted. Thus at time t5 460, as described with reference to FIG. 2, BG_OSC_ENABLE 160 signal is deasserted since all inputs to the OR gate 210 are deasserted, thereby disabling the selective portion of the SD 120, e.g., the device clock 126 and the band gap voltage reference 128, to return to the power saving mode. In an exemplary, non-depicted embodiment, if at time t5 460, a portion of the SD 120 has requested the device clock 126 to be operating in the power on state, e.g., by asserting the trigger signal 250, then the BG_OSC_ENABLE 160 signal continues to be asserted.

Figure 5:
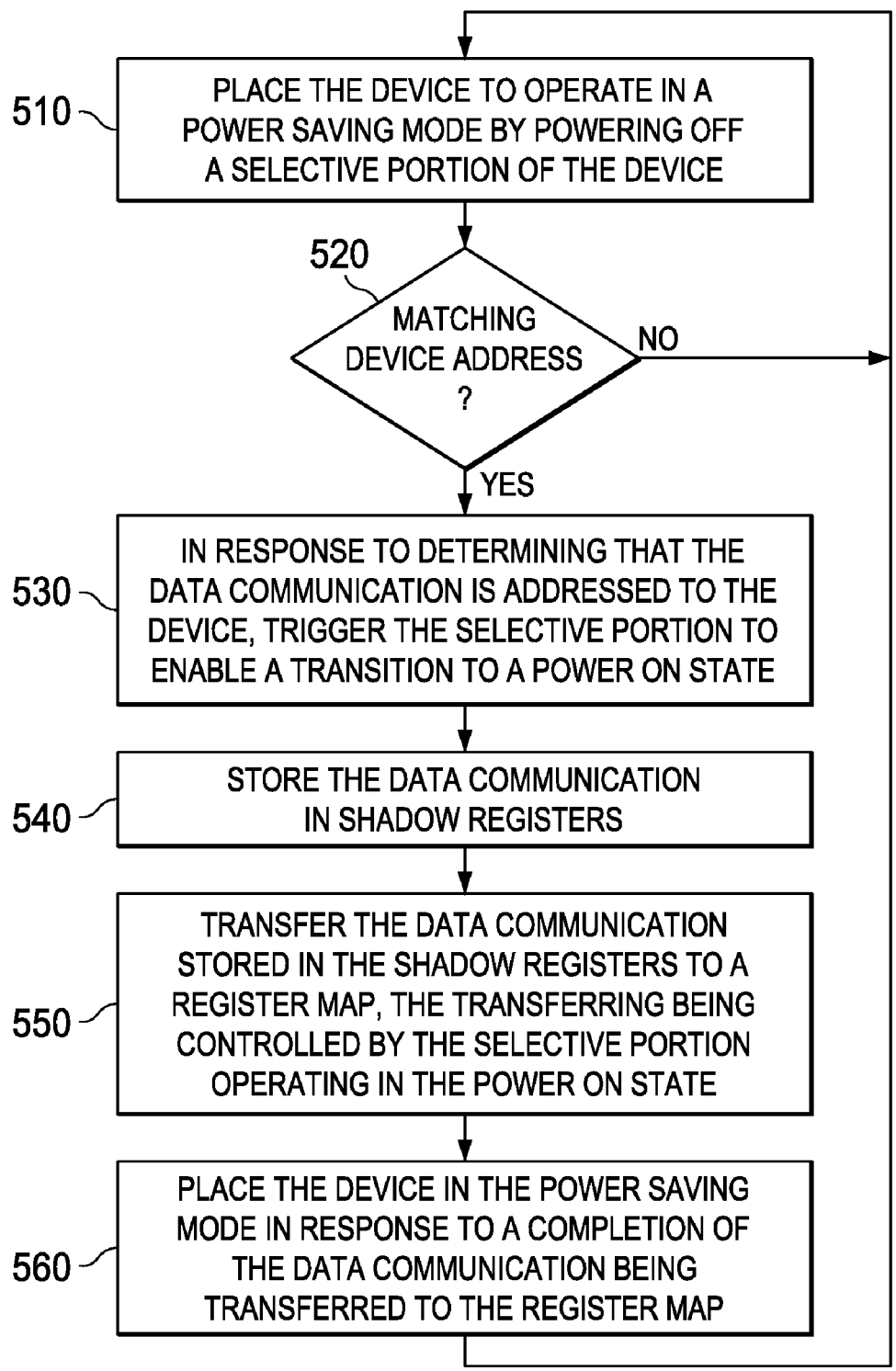
FIG. 5 is a flow chart illustrating a method for saving power in a device coupled to a bus, according to an embodiment.

FIG. 5 is a flow chart illustrating a method for saving power in a device coupled to a bus, according to an embodiment. In a particular embodiment, the method is used to save power consumed by the slave device 200 described with reference to FIGS. 1, 2, 3 and 4. At step 510, the device is placed to operate in a power saving mode by powering off a selective portion of the device. At step 520, a determination is made whether data communication over the bus is addressed to the device. At step 530, in response to determining that the data communication is addressed to the device, the selective portion is triggered to enable a transition to a power on state. At step 540, the data communication received over the bus is stored in shadow registers. At step 550, the data communication stored in the shadow registers is transferred to a register map, the transferring being controlled by the selective portion operating in the power on state.

Various steps described above may be added, omitted, combined, altered, or performed in different orders. For example, step 560 may be added to return the device to a power saving mode. At step 560, the device is placed in the power saving mode in response to a completion of the data communication being transferred to the register map and program control is transferred back to step 510.

Several advantages are achieved by the method and system according to the illustrative embodiments presented herein. The embodiments provide an improved method and apparatus for reducing power consumed by a slave device coupled to a bus while being responsive to capturing relevant I2C transactions. The embodiments described herein provide tools and techniques to enable slave devices to continuously operate in a power saving mode until data communication over an I2C bus is specifically addressed to the slave device. The embodiments described herein use a minimum number of extra registers (in addition to the register map), thereby resulting in reduced silicon area and reduced power compared to other circuit implementations that may shadow the entire register map. Components of the slave device supporting a synchronous mode such as an oscillator and band gap voltage reference are transitioned to a power on state only if the data communication is addressed to the slave device. Since the oscillator and the band gap voltage reference may experience a variable time delay in transitioning to the power on state, the turn on time for the oscillator and the band gap voltage reference components may be greater than the I2C transaction time. During the transition period, the tools and techniques provide capturing and storing of the data communication, ensuring that the oscillator and the band gap voltage reference are operating in the power on state, synchronously transfer the data communication to the slave device, and returning the slave device to the power saving mode upon completion of the synchronous transfer.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. For example, while certain aspects of the present disclosure have been described in the context of a slave device coupled to an I2C bus, those of ordinary skill in the art will appreciate that the apparatus and methods disclosed herein are capable of being implemented in any synchronous device coupled to an asynchronous bus.

The methods and systems described herein provide for an adaptable implementation. Although certain embodiments have been described using specific examples, it will be apparent to those skilled in the art that the invention is not limited to these few examples. The benefits, advantages, solutions to problems, and any element(s) that may cause any benefit, advantage, or solution to occur or become more pronounced are not to be construed as a critical, required, or an essential feature or element of the present disclosure.

The above disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for saving power in a device coupled to a bus, the method comprising:
   placing the device to operate in a power saving mode by powering off a selective portion of the device;
   determining whether data communication over the bus is addressed to the device;
   triggering the selective portion to transition to a power on state in response to determining that the data communication is addressed to the device;
   storing the data communication in shadow registers; and
   transferring the data communication stored in the shadow registers to a register map, the transferring being controlled by the selective portion operating in the power on state, and the transferring includes the substeps of:
      receiving a first pulse of an oscillator included in the selective portion of the device;
      storing the data communication in the register map responsive to the first pulse, the data communication including a data portion and a data address portion, the data portion being stored at a valid address location in the register map pointed to by the data address portion stored in the shadow registers;
   comparing the data address portion and a maximum address plus 1;
      generating a clear pulse signal is response to the address portion being less than the maximum address plus 1; and
   resetting the shadow registers with the clear pulse signal.

2. The method of claim 1, wherein the method further comprises placing the device in the power saving mode in response to a completion of the data communication being transferred to the register map.

3. The method of claim 1, wherein the selective portion of the device is triggered by asserting at least one of:
   an address match signal indicative of the data communication being addressed to the device;
   a data address included in the data communications being less than a maximum address plus 1;
   a clear pulse signal; and
   a trigger signal indicative of the selective portion being in the power on state.

4. The method of claim 1, wherein a delay in the triggering is greater than a transaction time to capture the data communication by the device.

5. The method of claim 1, wherein the storing of the data communication in shadow registers is controlled by a bus clock to asynchronously capture the data communication while the selective portion of the device is transitioning to the power on state.

6. The method of claim 1, wherein the transferring is controlled by a device clock included in the selective portion of the device, the transfer occurring at a first instance of the device clock being operable in the power on state.

7. The method of claim 1, wherein the method further comprises disabling the storing in response to detecting an assertion of a SDA_EN signal.

8. The method of claim 1, wherein the resetting further comprises:
   storing a 0 value in the data portion; and
   storing the maximum address plus 1 in the address portion.

9. An apparatus comprising:
   a shadow data register coupled to a bus, the shadow data register operable to receive a data portion of data communication over the bus;
   a shadow address register coupled to the bus, the shadow address register operable to receive a data address portion of the data communication;
   a register map coupled to the shadow data register and the shadow address register, the register map operable to store the data portion at a register map address corresponding to the data address portion;
   a comparator to compare the address portion and a maximum address plus 1, the comparator operable to generate a comparator output responsive to the data address portion being less than the maximum address plus 1; and
   a first flip flop and a second flip flop coupled in series with the comparator, the first flip flop being operable to receive the comparator output and provide a first output, the second flip flop being operable to receive the first output and provide a clear pulse signal, the clear pulse signal being provided to reset the shadow data register and the shadow address register to a configurable value.

10. The apparatus of claim 9, wherein the apparatus further comprises:
    a bus clock to asynchronously control the data communication from the bus to each one of the shadow data register and the shadow address register; and
    a device clock to synchronously control the data communication from the shadow data register and the shadow address register to the register map.

11. The apparatus of claim 10, wherein the device clock is powered off in a power saving mode on a trailing edge of the clear pulse signal.

12. The apparatus of claim 10, wherein a width of the clear pulse signal is configured to be equal to 2 periods of the device clock.

13. The apparatus of claim 10, wherein a first leading edge of the device clock triggers the store of the data portion in the register map.

14. The apparatus of claim 10, wherein a second leading edge of the device clock triggers a leading edge of the clear pulse signal.

15. The apparatus of claim 10 further comprising an OR gate, the OR gate configured to receive a plurality of inputs and provide a BG_OSC_ENABLE signal, the plurality of inputs including:
    an address match signal indicative of the data communication being addressed to the shadow data register and the shadow address register;
    the data address portion being less than the maximum address plus 1;
    the clear pulse signal; and
    a trigger signal indicative of the device clock being in the power on state.

16. The apparatus of claim 15, wherein the register map, the comparator, the first flip flop and the second flip flop are powered off in response to the BG_OSC_ENABLE signal being deasserted.

17. The apparatus of claim 9, wherein the apparatus further comprises:
    a third flip flop coupled to receive a SDA_EN signal and provide an SDA_EN_META1 signal;
    a fourth flip flop coupled to receive the SDA_EN_META1 signal and provide a SDA_EN_META2 signal; and
    a NOR gate coupled to receive the SDA_EN signal, the SDA_EN_META1 signal, and the SDA_EN_META2 signal and provide a write enable signal, the write enable signal used for controlling the store of the data portion.

18. The apparatus of claim 9, wherein the shadow data register, the shadow address register, the register map, the comparator, the first flip flop and the second flip flop are included in a driver circuit for an electroluminescence lamp.

19. The apparatus of claim 9, wherein the shadow data register, the shadow address register, the register map, the comparator, the first flip flop and the second flip flop are included in a slave device coupled to the bus, the bus being an I2C bus.

20. An apparatus comprising:
    a shadow data register that is operable to receive a data portion of data communication;
    a shadow address register that is operable to receive a data address portion of the data communication;
    a register map coupled to the shadow data register and the shadow address register;
    a comparator that is coupled to the shadow address register and that receives a maximum address plus 1; and
    a flip flop circuit that is coupled to the comparator, the shadow data register, and the shadow address register, wherein the flip flop circuit is operable to provide a clear pulse to reset the shadow data register and the shadow address register to a configurable value.

21. The apparatus of claim 20, wherein the apparatus further comprises a register map write enable circuit that is coupled to the register map.

22. The apparatus of claim 21, wherein the register map enable circuit further comprises:
    a plurality of flip flops coupled in series with one another; and
    a logic gate that is coupled to at least one of the plurality of flip-flops and the register map.

23. The apparatus of claim 22, wherein the plurality of flip flops further comprises:
    a first flip flop that receives an enable signal; and
    a second flip flop that is coupled to the first-flip.

24. The apparatus of claim 23, wherein the logic gate further comprises a NOR gate that receives the enable signal and an output from the each of the first and second flip flops.

25. The apparatus of claim 24, wherein the flip flop circuit further comprises:
    a third flip flop that is coupled to the comparator; and
    a fourth flip flop that is coupled to the third flip flop, the shadow address register, and the shadow data register.

* * * * *